United States Patent Office.

IVAN LEVINSTEIN AND CARL MENSCHING, OF MANCHESTER, ENGLAND, ASSIGNORS TO THE LEVINSTEIN, LIMITED, OF SAME PLACE.

BLACK AZO DYE AND PROCESS OF MAKING SAME.

SPECIFICATION forming part of Letters Patent No. 654,168, dated July 24, 1900.

Application filed January 17, 1900. Serial No. 1,764. (No specimens.)

*To all whom it may concern:*

Be it known that we, IVAN LEVINSTEIN, a citizen of the British Empire, and CARL MENSCHING, Ph. D., a citizen of the German Empire, both residing at Manchester, in the county of Lancaster, England, have invented certain new and useful Improvements in Black Azo Dyes and the Process of Making Same, of which the following is a full, clear, and exact description.

We have found that if acetyl-para-amido-benzene-azo-amido-alpha-naphthalene is diazotized and combined with naphthol sulfonic acids and the acetyl group is split off valuable azo dyes result, which dye wool in a neutral or acid bath deep-black shades which are fast to light and to washing.

To obtain the coloring-matters, we may proceed as follows: 30.4 kilos of acetyl-para-amidobenzene-azo-amido-alpha-naphthalene are suspended in three hundred liters of water containing seventy kilos of hydrochloric acid, (18° Baumé.) The mixture is cooled down with ice to about 5° centigrade, and eight kilos of sodium nitrite are added with constant stirring. The thus-produced diazo compound is added to a solution of twenty-five kilos of beta-naphthol sulfonic acid (Schaeffer) and forty-four kilos of soda or an equivalent proportion of other suitable alkali. The immediately-formed azo color is heated to about 80° centigrade and is salted out and filtered off. It is then dissolved in about one thousand liters of water and saponified in the usual known way to split off the acetyl group. After saponification the coloring-matter is salted out, filtered off, and dried.

The new coloring-matter is a black powder soluble in hot water with a bluish-black color. It dissolves in concentrated sulfuric acid (66° Baumé) with a dull-greenish color, which changes to red on dilution, and in an acid bath it dyes wool a deep-reddish black.

In the process above described, by way of example, the naphthol salt R may be substituted by an equivalent proportion of another naphthol sulfonic acid or of a salt containing that available proportion of such acid. The result of such variation is a slight variation in the shade of the dye, which in this case is from reddish to bluish black.

What we claim as our invention, and desire to secure by Letters Patent, is—

1. The process for the production of a black azo coloring-matter which consists in diazotizing acetyl-para-amidobenzene-azo-amido-alpha-naphthalene, combining the product in an alkaline solution with Schaeffer's naphthol sulfonic acid, and in splitting off the acetyl group by saponification, substantially as set forth.

2. As a new article of manufacture, the new black azo coloring-matter which is derived from diazotized acetyl-para-amidobenzene-azo-amido-alpha-naphthalene and Schaeffer's naphthol sulfonic acid, is a black powder soluble in water with a reddish-brown shade, in concentrated sulfuric acid with a dull greenish color changing to reddish-brown on dilution with water, is soluble in alcohol with a violet color, and which, in an acid or in a neutral saline bath, dyes wool a deep black.

In witness whereof we have subscribed our names to this specification in the presence of two subscribing witnesses.

IVAN LEVINSTEIN.
      CARL MENSCHING.

Witnesses:
 WILLIAM GEO. HEYS,
 ARTHUR MILLWARD.